United States Patent
Sanchez et al.

(10) Patent No.: US 12,159,242 B1
(45) Date of Patent: Dec. 3, 2024

(54) SYSTEMS AND METHODS FOR TRANSFORMING TELEMATICS DATA FOR AGNOSTIC USE

(71) Applicant: QUANATA, LLC, San Francisco, CA (US)

(72) Inventors: Kenneth Jason Sanchez, San Francisco, CA (US); Tina Fang, San Jose, CA (US)

(73) Assignee: QUANATA, LLC, San Francisco, CA (US)

( * ) Notice: Subject to any disclaimer, the term of this patent is extended or adjusted under 35 U.S.C. 154(b) by 597 days.

(21) Appl. No.: 17/469,396

(22) Filed: Sep. 8, 2021

Related U.S. Application Data

(60) Provisional application No. 63/077,225, filed on Sep. 11, 2020.

(51) Int. Cl.
*G06N 5/04* (2023.01)
*B60R 16/023* (2006.01)
*G07C 5/00* (2006.01)
*G06Q 30/0207* (2023.01)

(52) U.S. Cl.
CPC ........... *G06N 5/04* (2013.01); *B60R 16/0231* (2013.01); *G07C 5/008* (2013.01); *G06Q 30/0207* (2013.01)

(58) Field of Classification Search
CPC ...... G06N 5/04; B60R 16/0231; G07C 5/008; G06Q 30/0207
See application file for complete search history.

(56) References Cited

U.S. PATENT DOCUMENTS

| | | | |
|---|---|---|---|
| 8,301,330 B2 * | 10/2012 | Nielsen | H04W 4/029 701/32.7 |
| 9,672,667 B2 * | 6/2017 | Mason | G07C 5/008 |
| 9,699,527 B2 * | 7/2017 | Krishnan | H04Q 9/00 |
| 10,353,691 B2 | 7/2019 | Richter et al. | |
| 10,817,530 B2 | 10/2020 | Siebel et al. | |
| 2012/0253551 A1 | 10/2012 | Halimi et al. | |
| 2016/0263996 A1 | 9/2016 | Gerlach | |
| 2016/0294614 A1 | 10/2016 | Searle et al. | |
| 2019/0043275 A1 | 2/2019 | Cawse et al. | |

(Continued)

FOREIGN PATENT DOCUMENTS

WO 2018/201009 A1 11/2018

OTHER PUBLICATIONS

Ayuso et al., "Improving automobile insurance ratemaking using telematics: incorporating mileage and driver behaviour data", Transportation, vol. 46, No. 3, pp. 735-752.

(Continued)

*Primary Examiner* — Sizo B Vilakazi
(74) *Attorney, Agent, or Firm* — BRYAN CAVE LEIGHTON PAISNER LLP

(57) ABSTRACT

Method and system for transforming telematics data for agnostic use. For example, a computer-implemented method includes: receiving, from a first telematics system of a first type, telematics data in a first form, the telematics data being associated with a vehicle; and transforming, via a prediction model, the telematics data into a first prediction in a second form, the second form being: different from the first form, and the form which data collected, processed, stored, or transmitted by a second telematics system of a second type would be, the second type being different from the first type.

20 Claims, 7 Drawing Sheets

(56) References Cited

U.S. PATENT DOCUMENTS

| | | | |
|---|---|---|---|
| 2019/0122457 A1 | 4/2019 | Andritsopoulos | |
| 2020/0062274 A1* | 2/2020 | Kowal | G07C 5/02 |
| 2020/0202453 A1* | 6/2020 | Sworski | G07C 5/008 |
| 2020/0287775 A1* | 9/2020 | Khasis | H04W 4/185 |
| 2021/0014309 A1* | 1/2021 | Kim | G07C 5/02 |
| 2022/0301361 A1* | 9/2022 | Cawse | G06F 16/2379 |

OTHER PUBLICATIONS

Baecke et al., "The value of vehicle telematics data in insurance risk selection processes", Decision Support Systems, vol. 98, Jun. 2017, pp. 69-79.

Daley et al., "Telematics and Data Science: Informing Energy-Efficient Mobility", Telematics and Data Science: Informing Energy-Efficient Mobility. Golden, CO: National Renewable Energy Laboratory, NREL/SR-5400-73661, 2019, pp. 1-45.

Taherizadeh et al., "Real-time data-intensive telematics functionalities at the extreme edge of the network: Experience with the PrEstoCloud Project", In 2018 IEEE 42nd Annual Computer Software and Applications Conference, (COMPSAC), vol. 2, 2018, pp. 522-527.

\* cited by examiner

SYSTEMS AND METHODS FOR TRANSFORMING TELEMATICS DATA FOR AGNOSTIC USE

CROSS-REFERENCES TO RELATED APPLICATIONS

This application claims priority to U.S. Patent Application No. 63/077,225, filed Sep. 11, 2020, incorporated by reference herein for all purposes.

FIELD OF THE DISCLOSURE

Some embodiments of the present disclosure are directed to processing of telematics data. More particularly, certain embodiments of the present disclosure provide methods and systems for transforming telematics data for agnostic use. Merely by way of example, the present disclosure has been applied to telematics data, but it would be recognized that the present disclosure has much broader range of applicability.

BACKGROUND OF THE DISCLOSURE

Telematics data may be collected, processed, stored, and/or transmitted differently by different types of telematics systems. Therefore, it is desirable to have systems and methods for transforming telematics data for agnostic use.

BRIEF SUMMARY OF THE DISCLOSURE

Some embodiments of the present disclosure are directed to processing of telematics data. More particularly, certain embodiments of the present disclosure provide methods and systems for transforming telematics data for agnostic use. Merely by way of example, the present disclosure has been applied to telematics data, but it would be recognized that the present disclosure has much broader range of applicability.

According to various embodiments, a computer-implemented method for transforming telematics data for agnostic use includes: receiving, from a first telematics system of a first type, telematics data in a first form, the telematics data being associated with a vehicle; and transforming, via a prediction model, the telematics data into a first prediction in a second form, the second form being: different from the first form, and the form which data collected, processed, stored, or transmitted by a second telematics system of a second type would be, the second type being different from the first type.

According to various embodiments, a system for transforming telematics data for agnostic use, the system comprising: one or more processors; and a memory storing instructions that, upon execution by the one or more processors, cause the computing system to perform one or more processes including: receiving, from a first telematics system of a first type, telematics data in a first form, the telematics data being associated with a vehicle; and transforming, via a prediction model, the telematics data into a first prediction in a second form, the second form being: different from the first form, and the form which data collected, processed, stored, or transmitted by a second telematics system of a second type would be, the second type being different from the first type.

According to various embodiments, a non-transitory computer-readable medium storing instructions for data management, the instructions upon execution by one or more processors of a computing system, cause the computing system to perform one or more processes including: receiving, from a first telematics system of a first type, telematics data in a first form, the telematics data being associated with a vehicle; and transforming, via a prediction model, the telematics data into a first prediction in a second form, the second form being: different from the first form, and the form which data collected, processed, stored, or transmitted by a second telematics system of a second type would be, the second type being different from the first type.

Depending upon the embodiment, one or more benefits may be achieved. These benefits, features, and advantages of the present disclosure can be fully appreciated with reference to the detailed description and accompanying drawings that follow.

DETAILED DESCRIPTION OF THE DISCLOSURE

Figure 1:
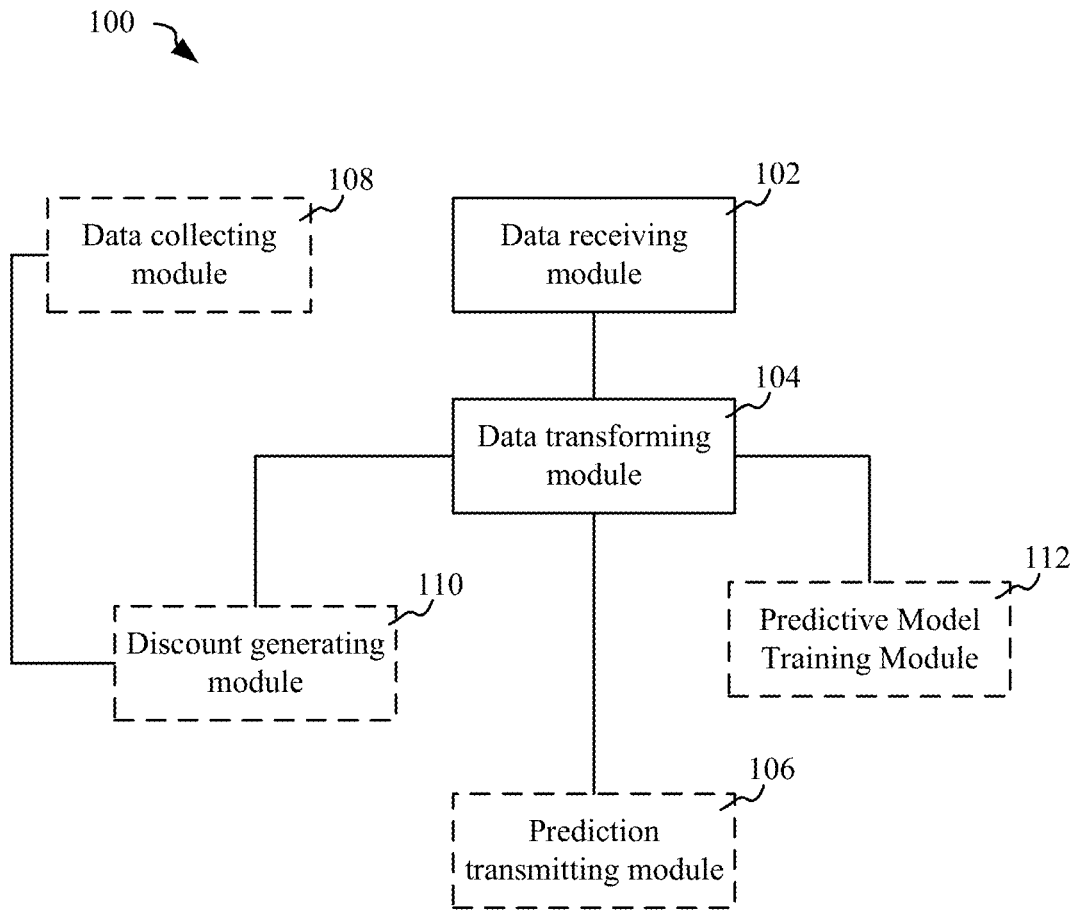
FIG. 1 is a simplified diagram showing a system for transforming telematics data for agnostic use, according to various embodiments of the present disclosure.

Some embodiments of the present disclosure are directed to processing of telematics data. More particularly, certain embodiments of the present disclosure provide methods and systems for transforming telematics data for agnostic use. Merely by way of example, the present disclosure has been applied to telematics data, but it would be recognized that the present disclosure has much broader range of applicability.

In various embodiments, systems and methods for transforming (e.g., translating or converting) telematics data (e.g., sensor data associated with a vehicle) includes receiving (e.g., gaining) data collected, processed, stored, and/or transmitted from a first type of telematics system, processing and generating a prediction based at least in part upon the data, the prediction being associated with the data that would have been if collected, processed, stored, and/or transmitted by a different telematics system that is different from the first type.

In various embodiments, systems and methods for transforming (e.g., translating or converting) telematics data (e.g., sensor data associated with a vehicle) includes receiving (e.g., gaining) data collected, processed, stored, and/or transmitted from multiple telematics systems of various types, processing and generating predictions based at least in part upon the data, the predictions being in a universal data type recognized by a target system.

In various embodiments, systems and methods includes receiving and processing data collected via one or more mobile devices, such as from a device separate from the vehicle (e.g., a smartphone), from a device of the vehicle (e.g., an on-board vehicle device such as sensors), and/or from an external source (e.g., a road camera, on-board vehicle device such as sensors from other vehicles).

In various embodiments, systems and methods includes estimating or generating a discount which a user (e.g., a driver) would receive at a point of sale based at least in part upon the collected data, processed data, and/or the prediction generated based at least in part upon the data. In various examples, the data include data from multiple telematics systems, such as telematics systems of different types. In some examples, the data include telematics data and non-telematics data (e.g., survey data, customer data, game data, test data, site interaction data, and/or data associated with a quote flow).

In certain embodiments, systems and methods includes training and/or using a neural network or other machine learning algorithm to transform (e.g., translate) data (e.g., raw sensor data) collected from a first type of telematics device to a prediction, the prediction being what the data would have been if collected, processed, stored, and/or transmitted from another type of device (e.g., another telematics device of a type that is different from the first type). For example, systems and methods may receive first data from a first telematics device of a first type (e.g., from a first party, such as a first vendor), the first data collected, processed, stored, and/or transmitted in 15 Hz, and/or receive second data from a second telematics device of a second type (e.g., from a second party, such as a second vendor), the first data collected, processed, stored, and/or transmitted in 30 Hz. In some examples, the systems and methods include processing the first data from 15 Hz to 30 Hz, and/or processing the second data from 30 Hz to 15 Hz. In certain examples, the systems and methods include processing the first data from 15 Hz and/or the second data from 30 Hz to a universal data type recognized by a target system, such as 5 Hz.

In certain embodiments, the data may differ in addition to or alternatively to the sampling rate. As an example, different telematics systems may collect, record, and/or process data at different sampling time intervals. In some examples, different telematics systems of different types may collect, record, and/or calibrate data differently. As an example, different telematics systems may rotate raw accelerometer data collected by mobile devices differently to be aligned with their corresponding vehicles instead of the mobile devices. Due to the different rotation methods used for such alignment (e.g., a calibration), the final data output (e.g., estimate or signal) may be different in format and/or value.

In certain embodiments, systems and methods includes receiving, as input, data from a first telematics system of a first type, and generate an estimate, as output, based at least in part upon the data, the output being what would the data would have been if collected, processed, stored, and/or transmitted from a second telematics system of a second type. In various examples, systems and methods includes: creating a training dataset comprising sensor data from a set of common trips shared by the first telematics system and the second telematics system; training a model (e.g., a machine learning model), based at least in part upon the training dataset, to take in data associated with the common set of trips, as input, of the first telematics system and to generate (e.g., predict) predictions, as output, equal to data associated with the common set of trips of the second telematics system. In certain examples, the training of the model includes using Neural Machine Translation via a recurrent neural network.

In certain embodiments, the training and/or using of the model includes using a windowing approach over the data, such as by using all the data in a block of time, such as seven rows of a dataset, as features to predict one observation from another dataset. For example, a first telematics system and a second telematics system both collect one observation per second, predicting a prediction at a certain timepoint (e.g., $t=5$) in one dataset associated with the first telematics system may be based on using multiple timepoints (e.g., $t=3$, $t=4$, $t=5$, $t=6$, and $t=7$) of the other dataset associated with the second telematics system. The training dataset used to train such the model would include observations in this form.

In certain embodiments, the training and/or using of the model includes transforming (e.g., translating) one signal from an original level into one or more higher levels (e.g., concepts). In some examples, the systems and/or methods may predict a probability that a driving event (e.g., a hard braking event) occurred at a time of interest in a second dataset, based at least in part upon the raw sensor data of a first dataset. As an example, the systems and/or methods includes receiving raw data from two sources (e.g., telematics systems, such as of different types), determining which one or more time points (e.g., seconds) of a trip where hard braking occurred based on data from the first source, and predicting, based on raw data from the second source for each time point of the one or more time points, probability of a hard braking event occurred as described by the data from the first source.

In certain embodiments, the training and/or using of the model includes using one or more recurrent neural networks to predict trip-level results. In some examples, the systems and/or methods may determine that a trip has a first amount (e.g., twenty) of braking events based on analyzing data from a first source. Then, the systems and/or methods may input data from the second source into a neural network as input and modify the neural network such that it outputs a prediction of the number of hard braking events, from the data of the second source, that matches the first amount (i.e. twenty). In various examples, a recurrent neural network is used, but other machine learning models may be used instead. In certain examples, the systems and/or methods may create one or more higher level features based on the trip data from the second source. The one or more higher level features may include the number of hard braking events in the data, the number of observations in the data, and/or the average magnitude of braking events.

In certain embodiments, each telematics system of the multiple telematics systems of different types may be associated with a party offering an app-only telematics system, a party offering an on-board diagnostics solution, or an original equipment manufacturer. In various examples, the data from the multiple telematics systems of different types are similar, but without adapting systems and/or methods of the present disclosure to transform data for agnostic use, one or more party-specific differences may cause errors for a target system if the target system is only configured to use data of a certain type of telematics system. For example, if without adapting systems and/or methods of the present disclosure to transform data for agnostic use, errors may occur when one trains a target system to use data of a first telematics system but inputs data of a second telematics system into the target system.

In certain embodiments, all available data (e.g., in a server and/or a client device) are transformed (e.g., translated). For example, available data include accelerometer data, gyroscope data, magnetometer data, location data, distraction data, speed limit data, and/or speed data. At the event or trip-level, available data may include braking events, cornering events, acceleration events, speeding events, time driving, and/or time distracted.

One or More Systems for Transforming Telematics Data for Agnostic Use According to Various Embodiments FIG. 1 is a simplified diagram showing a system 100 for transforming telematics data for agnostic use, according to various embodiments of the present disclosure. This figure is merely an example, which should not unduly limit the scope of the claims. One of ordinary skill in the art would recognize many variations, alternatives, and modifications. In some examples, system 100 includes a data receiving module 102 and a data transforming module 104. In certain examples, system 100 is configured to implement method 400 of FIG. 4. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the data receiving module 102 is configured to receive, such as from a first telematics system of a first type, telematics data in a first form. In some examples, the telematics data being associated with a vehicle. In some examples, the data receiving module 102 is configured to receive non-telematics data including survey data, customer data, game data, test data, site interaction data, and/or data associated with a quote flow. In some examples, telematics data, such as in the first form and/or in the second form, include accelerometer data, gyroscope data, magnetometer data, location data, distraction data, speed limit data, speed data, braking events, cornering events, acceleration events, speeding events, time driving, and/or time distracted.

In various embodiments, the data transforming module 104 is configured to transform, such as via a prediction model, the telematics data into a first prediction in a second form. In various examples, the second form is different from the first form. In some examples, the second form is the form which data collected, processed, stored, and/or transmitted by a second telematics system of a second type would be. In some examples, the second type is different from the first type. In some examples, the data transforming module 104 is configured to transform, such as via the prediction model, the non-telematics data into a second prediction in the second form.

In some embodiments, the first form includes a first sampling rate, a first sampling time intervals, a first data unit, a first rotational calibration modifier, and/or a first level of information. In some examples, the second form includes a second sampling rate, a second sampling time intervals, a second data unit, a second rotational calibration modifier, and/or a second level of information. In some examples, the second sampling rate being different from the first sampling rate. In some examples, the second sampling time intervals being different from first sampling time intervals. In some examples, the second data unit being different from the first data unit. In some examples, the second rotational calibration modifier being different from the first rotational calibration modifier. In some examples, the second level of information being different from the first level of information. In some examples, the first level of information and/or the second level of information includes one or more driving behavioral inferences. In some examples, the one or more driving behavioral inferences includes braking behaviors, steering behaviors, acceleration behaviors, distraction behaviors, and/or focus behaviors.

In some embodiments, the first type includes a first model type, a first model year, a first firmware version, a first hardware version, a first data collection protocol, a first data processing protocol, a first data storing protocol, and/or a first data transmission protocol. In some examples, the second type includes a second model type, a second model year, a second firmware version, a second hardware version, a second data collection protocol, a second data processing protocol, a second data storing protocol, and/or a second data transmission protocol. In some examples, the second model type being different from the first model type. In some examples, the second model year being different from the first model year. In some examples, the second firmware version being different from the first firmware version. In some examples, the second hardware version being different from the first hardware version. In some examples, the second data collection protocol being different from the first data collection protocol. In some examples, the second data processing protocol being different from the first data processing protocol. In some examples, the second data storing protocol being different from the first data storing protocol. In some examples, the second data transmission protocol being different from the first data transmission protocol. In some examples, the first model type and/or the second model type is a vehicle on-board computer, a mobile device, or a wearable device.

In various embodiments, system 100 further includes a prediction transmitting module 104 configured to transmit the first prediction to a target device configured to generate a discount for a user associated with the vehicle based at least in part upon data in the second form.

In various embodiments, system 100 further includes a data collecting module 108 configured to collect, such as via the second telematics system of the second type, telematics data in the second form.

In various embodiments, system 100 further includes a discount generating module 110 configured to generate a discount for a user associated with the vehicle based at least in part upon the first prediction. In some examples, the discount generating module 110 is configured to generate the discount based at least in part upon the first prediction and the non-telematics data. In some examples, the discount generating module 110 is configured to generate the discount based at least in part upon the first prediction and the second prediction. In some examples, the discount generating module 110 is configured to generate a discount for a user associated with the vehicle based at least in part upon the first prediction and the second telematics system of the second type.

In various embodiments, system 100 further includes a predictive model training module 112 configured to train the prediction model, which may be a machine learning model such as a neural network. In some examples, the predictive model training module 112 is configured to receive, by the prediction model, first training data of the first form associated with the first telematics system. In some examples, the first training data are associated with a set of common trips. In some examples, the predictive model training module 112 is further configured to receive, by the prediction model, second training data of the second form associated with the second telematics system. In some examples, the second training data are associated with the common set of trips. In some examples, the predictive model training module 112 is further configured to modify the predictive model such that upon receiving the first training data as input, the predictive model generates, based at least in part upon the first training data, training output that substantially matches (e.g., more than 50%, 60%, 70%, 80%, 90%, 95%, or 99%) the second training data. In some examples, the first training data and the second training data differ in sampling rate, sampling time intervals, data unit, rotational calibration modifier, and/or level of information.

Figure 2:
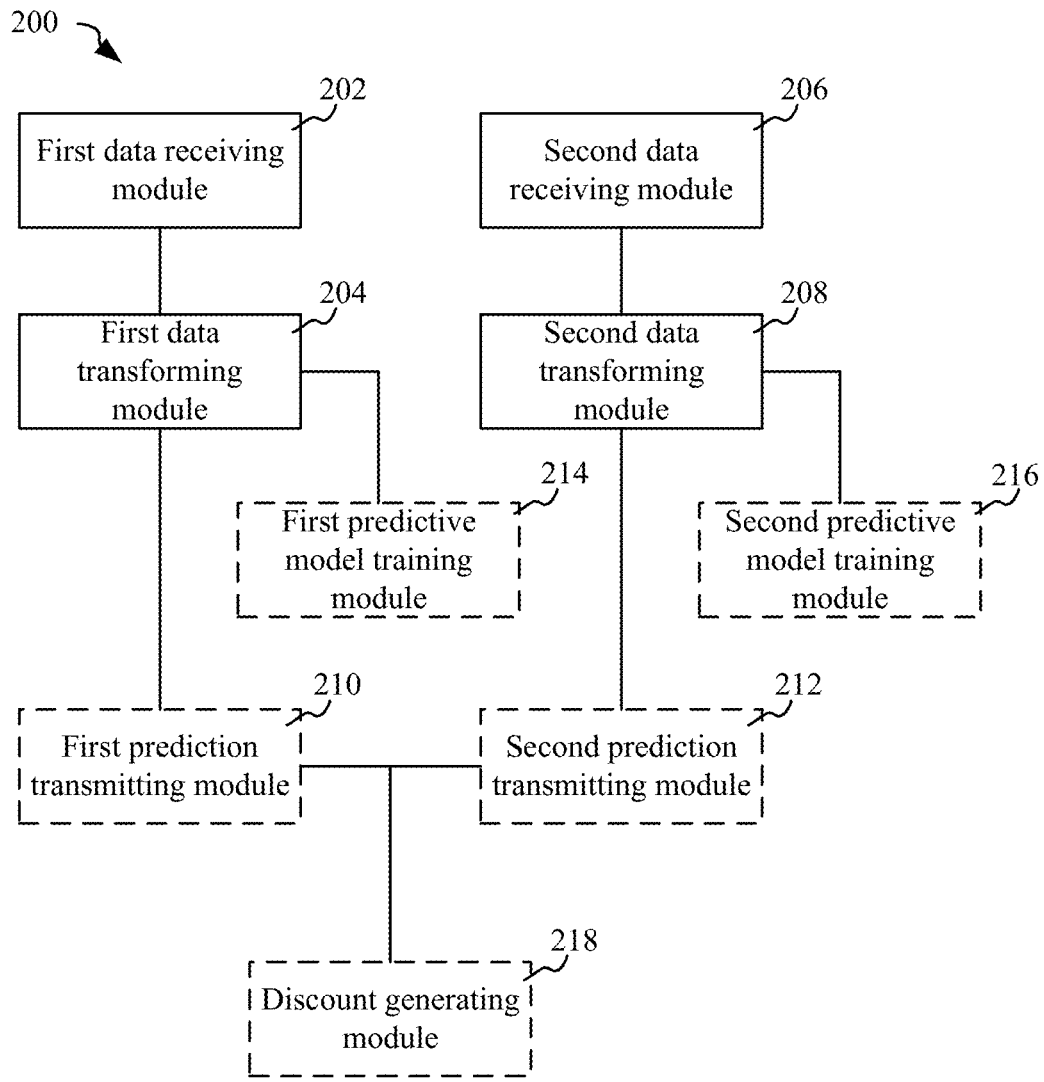
FIG. 2 is a simplified diagram showing a system for transforming telematics data from multiple sources for agnostic use, according to various embodiments of the present disclosure.

One or More Systems for Transforming Telematics Data from Multiple Sources for Agnostic Use According to Various Embodiments FIG. 2 is a simplified diagram showing a system 200 for transforming telematics data from multiple sources for agnostic use, according to various embodiments of the present disclosure. This figure is merely an example, which should not unduly limit the scope of the claims. One of ordinary skill in the art would recognize many variations, alternatives, and modifications. In some examples, system 200 includes a first data receiving module 202, a first data transforming module 204, a second data receiving module 206, and a second data transforming module 208. In certain examples, system 200 is configured to implement method 400 of FIG. 4. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the first data receiving module 202 is configured to receive, such as from a first telematics system of a first type, first telematics data in a first form. In some examples, the first telematics is being associated with sensor data associated with a vehicle. In various embodiments, the first data transforming module 204 is configured to transform, such as via a first prediction model, the first telematics data into a first prediction in a universal form.

In various embodiments, the second data receiving module 206 is configured to receive, such as from a second telematics system of a second type, second telematics data in a second form. In some examples, the second telematics data is associated with sensor data associated with the vehicle. In various embodiments, the second data transforming module 208 is configured to transform, such as via a second prediction model, the second telematics data into a second prediction in the universal form.

In various embodiments, system 200 further includes a first predictive transmitting module 210 configured to transmit the first prediction to a target device configured to generate a discount for a user associated with the vehicle based at least in part upon data in the universal form. In various embodiments, system 200 further includes a second predictive transmitting module 212 configured to transmit the second prediction to a target device configured to generate the discount for the user associated with the vehicle based at least in part upon data in the universal form.

In various embodiments, system 200 further includes a first predictive model training module 214 configured to train the first predictive model, which may be a machine learning model such as a neural network. In various embodiments, system 200 further includes a second predictive model training module 216 configured to train the second predictive model, which may be a machine learning model such as a neural network. The training of the first predictive model and/or the second predictive model may be performed using supervised training methods.

In various embodiments, system 200 further includes a discount generating module 218 configured to generate, such as via a discount model configured to generate discounts based at least in part upon data in the universal form, a discount for a user associated with the vehicle based at least in part upon the first prediction and the second prediction.

Figure 3:
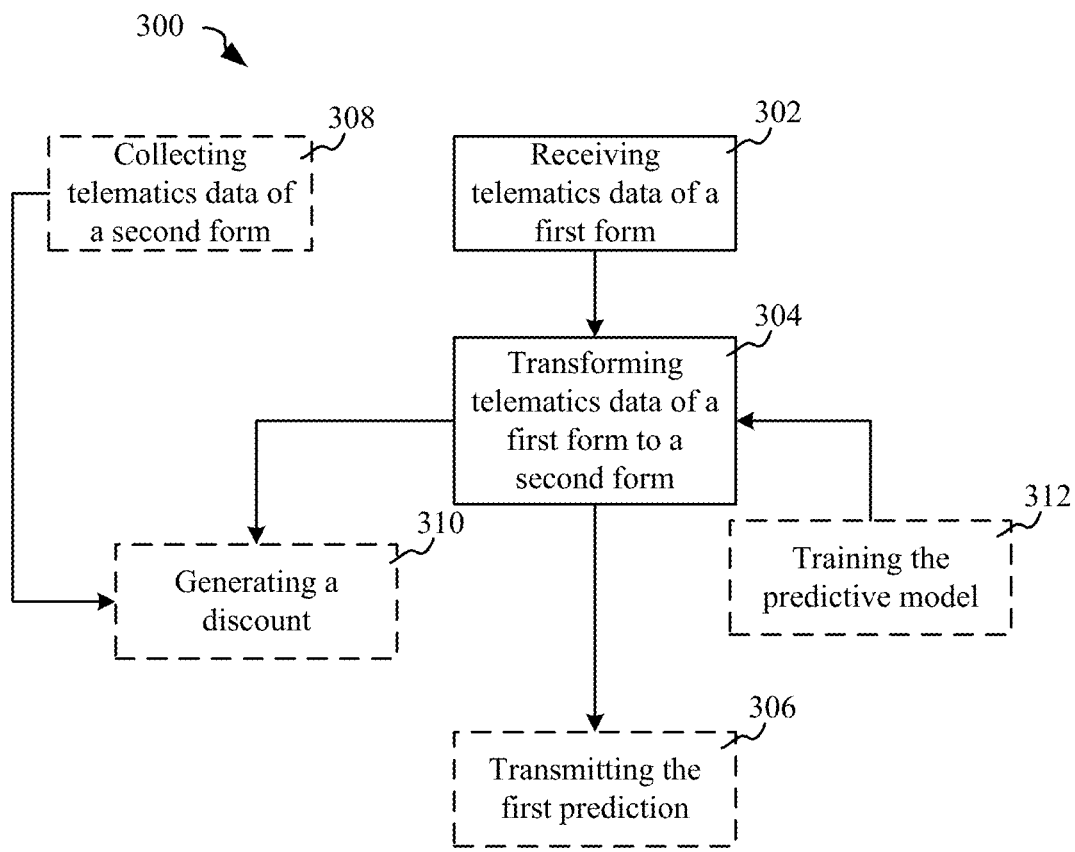
FIG. 3 is a simplified diagram showing a method for transforming telematics data for agnostic use, according to various embodiments of the present disclosure.

One or More Methods for Transforming Telematics Data for Agnostic Use According to Various Embodiments FIG. 3 is a simplified method for transforming telematics data for agnostic use, according to various embodiments of the present disclosure. This figure is merely an example, which should not unduly limit the scope of the claims. One of ordinary skill in the art would recognize many variations, alternatives, and modifications. Method 300 includes process 302 of receiving telematics data in a first form and process 304 of transforming the telematics data into a first prediction in a second form. In certain examples, method 300 is configured to be implemented by system 100 of FIG. 1. Although the above has been shown using a selected group of processes for the method, there can be many alternatives, modifications, and variations. In some examples, some of processes may be expanded and/or combined. Other processes may be inserted to those noted above. Depending upon the embodiment, the sequence of processes may be interchanged with others replaced. In some examples, some or all processes of the method are performed by a computing system or processor directed by instructions stored in memory. As an example, some or all processes of the method are performed according to instructions stored in a non-transitory computer-readable medium.

In various embodiments, process 302 of receiving telematics data in a first form includes receiving, such as from a first telematics system of a first type, telematics data in a first form. In some examples, the telematics data being associated with a vehicle. In some examples, process 302 of receiving telematics data in a first form includes receiving non-telematics data including survey data, customer data, game data, test data, site interaction data, and/or data associated with a quote flow. In some examples, telematics data, such as in the first form and/or in the second form, include accelerometer data, gyroscope data, magnetometer data, location data, distraction data, speed limit data, speed data, braking events, cornering events, acceleration events, speeding events, time driving, and/or time distracted.

In various embodiments, process 304 of transforming the telematics data into a first prediction in a second form includes transforming, such as via a prediction model, the telematics data into a first prediction in a second form. In some examples, the second form is different from the first form. In some examples, the second form is the form which data collected, processed, stored, and/or transmitted by a second telematics system of a second type would be. In some examples, the second type being different from the first type. In some examples, process 304 of transforming the telematics data into a first prediction in a second form includes transforming, such as via the prediction model, the non-telematics data into a second prediction in the second form.

In some embodiments, the first form includes a first sampling rate, a first sampling time intervals, a first data unit, a first rotational calibration modifier, and/or a first level of information. In some examples, the second form includes a second sampling rate, a second sampling time intervals, a second data unit, a second rotational calibration modifier, and/or a second level of information. In some examples, the second sampling rate being different from the first sampling rate. In some examples, the second sampling time intervals being different from first sampling time intervals. In some examples, the second data unit being different from the first data unit. In some examples, the second rotational calibration modifier being different from the first rotational calibration modifier. In some examples, the second level of information being different from the first level of information. In some examples, the first level of information and/or the second level of information includes one or more driving behavioral inferences. In some examples, the one or more driving behavioral inferences includes braking behaviors, steering behaviors, acceleration behaviors, distraction behaviors, and/or focus behaviors.

In some embodiments, the first type includes a first model type, a first model year, a first firmware version, a first hardware version, a first data collection protocol, a first data processing protocol, a first data storing protocol, and/or a first data transmission protocol. In some examples, the second type includes a second model type, a second model year, a second firmware version, a second hardware version, a second data collection protocol, a second data processing protocol, a second data storing protocol, and/or a second data transmission protocol. In some examples, the second model type being different from the first model type. In some examples, the second model year being different from the first model year. In some examples, the second firmware version being different from the first firmware version. In some examples, the second hardware version being different from the first hardware version. In some examples, the second data collection protocol being different from the first data collection protocol. In some examples, the second data processing protocol being different from the first data processing protocol. In some examples, the second data storing protocol being different from the first data storing protocol. In some examples, the second data transmission protocol being different from the first data transmission protocol. In some examples, the first model type and/or the second model type is a vehicle on-board computer, a mobile device, or a wearable device.

In various embodiments, method 300 further includes process 306 of transmitting the first prediction to a target device. In some examples, the target device is configured to generate a discount for a user associated with the vehicle based at least in part upon data in the second form.

In various embodiments, method 300 further includes process 308 of collecting, such as via a second telematics system of the second type, telematics data in the second form.

In various embodiments, method 300 further includes process 310 of generating a discount for a user associated with the vehicle, such as based at least in part upon the first prediction. In some examples, process 310 of generating a discount includes generating a discount for a user associated with the vehicle based at least in part upon the first prediction. In some examples, process 310 of generating a discount includes generating the discount based at least in part upon the first prediction and the non-telematics data. In some examples, process 310 of generating a discount includes generating the discount based at least in part upon the first prediction and the second prediction. In some examples, process 310 of generating a discount includes generating a discount for a user associated with the vehicle based at least in part upon the first prediction and the second telematics system of the second type.

In various embodiments, method 300 further includes process 312 of training the predictive model, which may be a machine learning model such as a neural network. In some examples, process 312 of training the predictive model includes receiving, by the prediction model, first training data of the first form associated with the first telematics system. In some examples, the first training data are associated with a set of common trips. In some examples, process 312 of training the predictive model further includes receiving, by the prediction model, second training data of the second form associated with the second telematics system. In some examples, the second training data are associated with the common set of trips. In some examples, process 312 of training the predictive model further includes modifying the predictive model such that upon receiving the first training data as input, the predictive model generates, based at least in part upon the first training data, training output that substantially matches (e.g., more than 50%, 60%, 70%, 80%, 90%, 95%, or 99%) the second training data. In some examples, the first training data and the second training data differ in sampling rate, sampling time intervals, data unit, rotational calibration modifier, and/or level of information.

Figure 4:
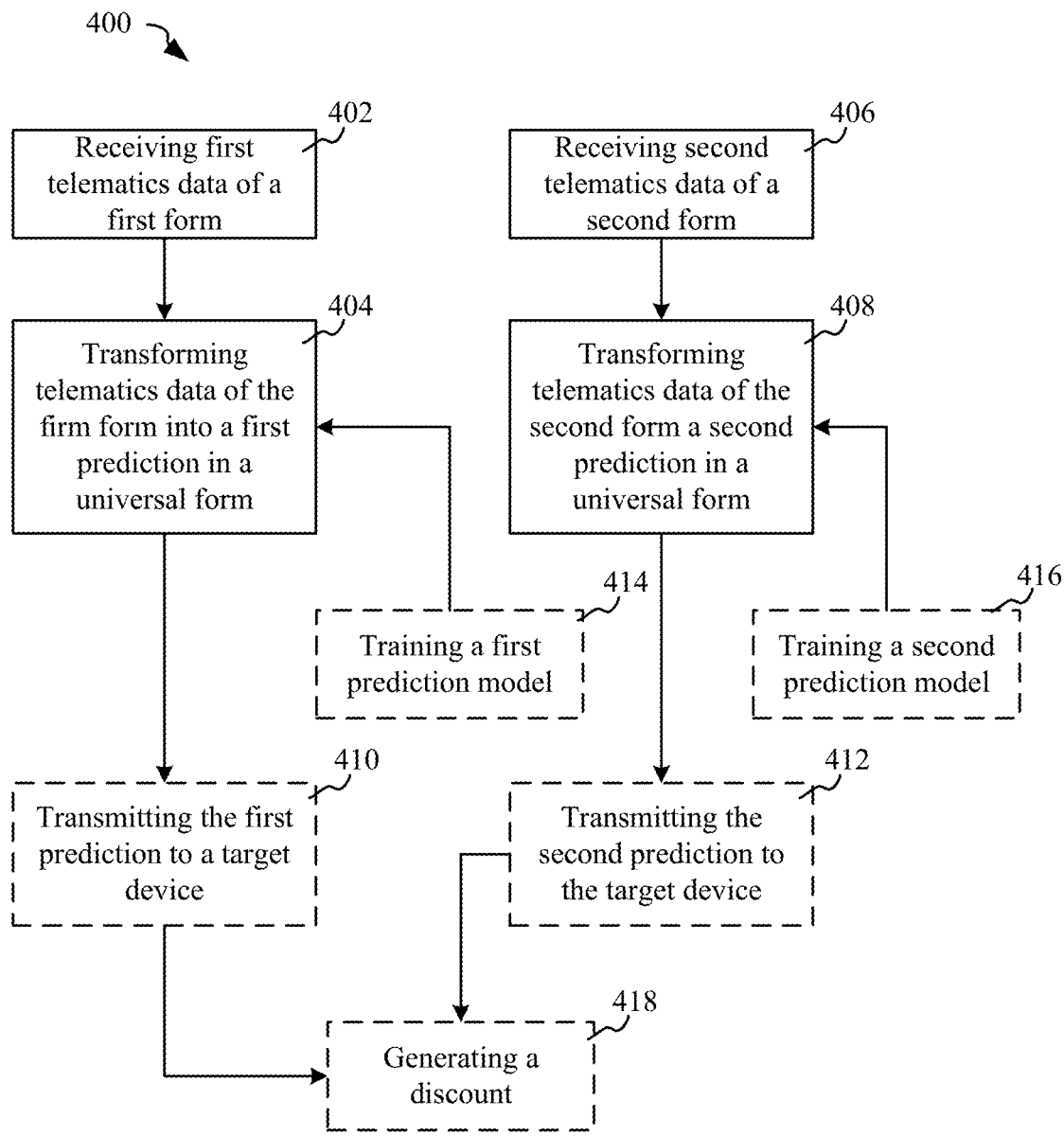
FIG. 4 is a simplified diagram showing a method for transforming telematics data from multiple sources for agnostic use, according to various embodiments of the present disclosure.

One or More Methods for Transforming Telematics Data from Multiple Sources for Agnostic Use According to Various Embodiments FIG. 4 is a simplified method for transforming telematics data for agnostic use, according to various embodiments of the present disclosure. This diagram is merely an example, which should not unduly limit the scope of the claims. One of ordinary skill in the art would recognize many variations, alternatives, and modifications. Method 400 includes process 402 of receiving first telematics data in a first form, process 404 of transforming the first telematics data of the first form into a first prediction in a universal form, process 406 of receiving second telematics data in a second form, process 408 of transforming the second telematics data into a second prediction in the universal form. In certain examples, method 400 is configured to be implemented by system 200 of FIG. 2. Although the above has been shown using a selected group of processes for the method, there can be many alternatives, modifications, and variations. In some examples, some of processes may be expanded and/or combined. Other processes may be inserted to those noted above. Depending upon the embodiment, the sequence of processes may be interchanged with others replaced. In some examples, some or all processes of the method are performed by a computing system or processor directed by instructions stored in memory. As an example, some or all processes of the method are performed according to instructions stored in a non-transitory computer-readable medium.

Figure 5:
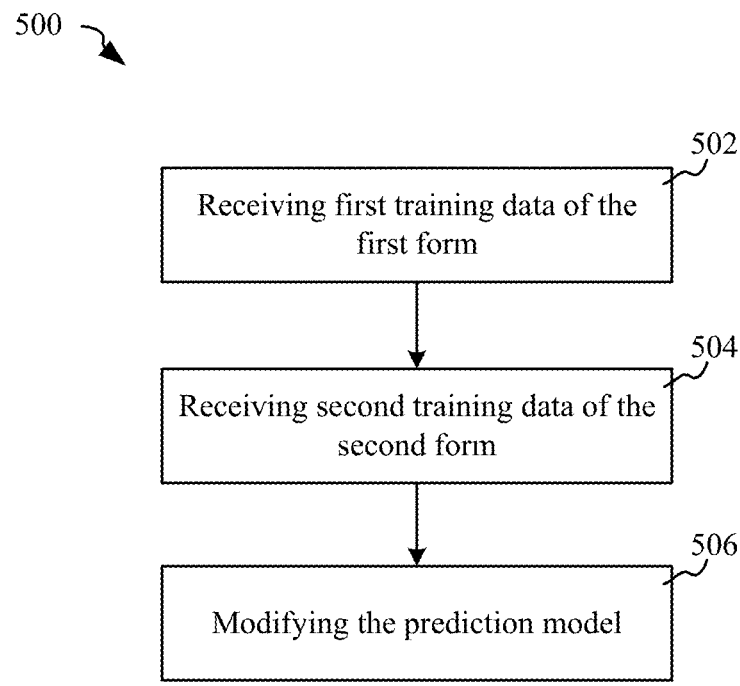
FIG. 5 is a simplified diagram showing a method for training a prediction model for transforming telematics data for agnostic use, according to various embodiments of the present disclosure.

One or More Methods for Training a Prediction Model for Transforming Data for Agnostic Use According to Various Embodiments FIG. 5 is a simplified method for transforming telematics data for agnostic use, according to various embodiments of the present disclosure. This figure is merely an example, which should not unduly limit the scope of the claims. One of ordinary skill in the art would recognize many variations, alternatives, and modifications. Method 500 includes process 502 of receiving first training data of the first form, process 504 of receiving training data of the second form, and process 506 of modifying prediction model. Although the above has been shown using a selected group of processes for the method, there can be many alternatives, modifications, and variations. In some examples, some of processes may be expanded and/or combined. Other processes may be inserted to those noted above. Depending upon the embodiment, the sequence of processes may be interchanged with others replaced. In some examples, some or all processes of the method are performed by a computing system or processor directed by instructions stored in memory. As an example, some or all processes of the method are performed according to instructions stored in a non-transitory computer-readable medium.

In various embodiments, process 502 of receiving first training data of the first form includes receiving, by the prediction model, first training data of the first form associated with the first telematics system. In some examples, the first training data are associated with a set of common trips.

In various embodiments, process 504 of receiving second training data of the second form includes receiving, by the prediction model, second training data of the second form associated with the second telematics system. In some examples, the second training data are associated with the common set of trips.

In various embodiments, process 506 of modifying prediction model includes modifying the predictive model such that upon receiving the first training data as input, the predictive model generates, based at least in part upon the first training data, training output that substantially matches (e.g., more than 50%, 60%, 70%, 80%, 90%, 95%, or 99%) the second training data. In some examples, the first training data and the second training data differ in sampling rate, sampling time intervals, data unit, rotational calibration modifier, and/or level of information.

One or More Computer Devices According to Various Embodiments

Figure 6:
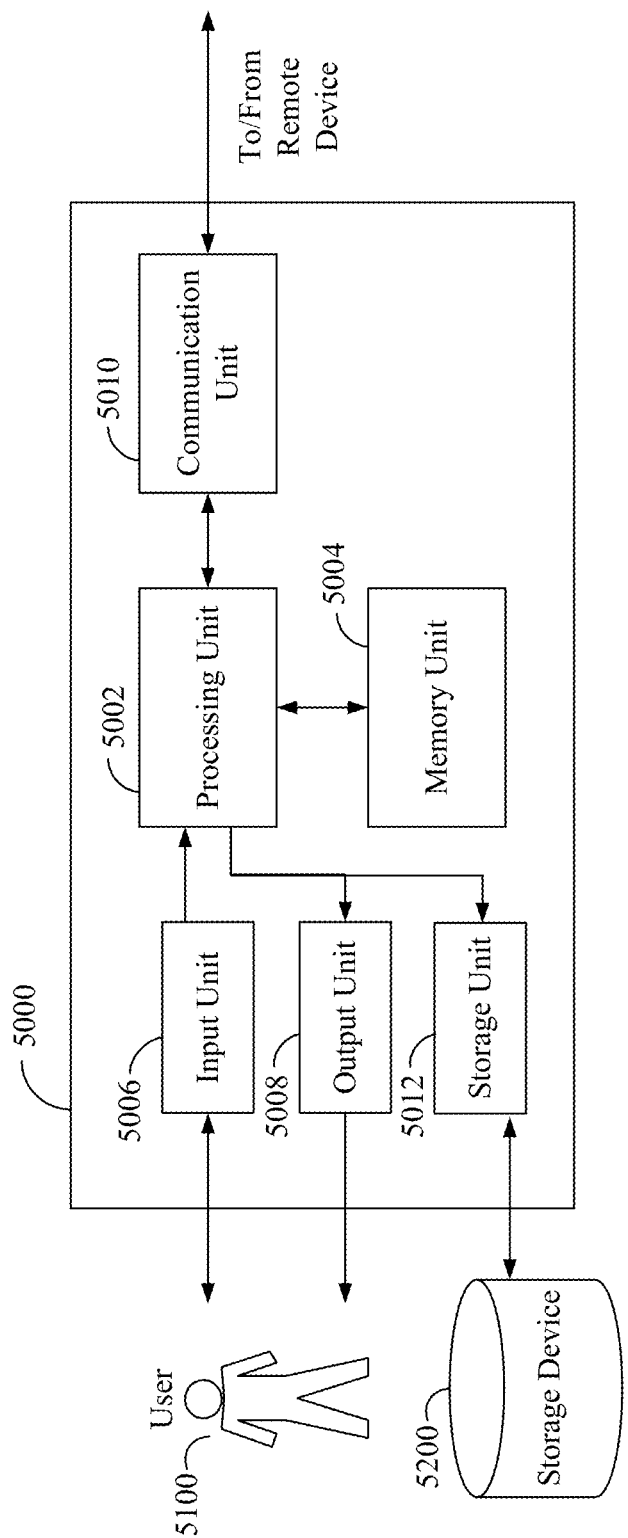
FIG. 6 is a simplified diagram showing a computer device, according to various embodiments of the present disclosure.

FIG. 6 is a simplified diagram showing a computer device 5000, according to various embodiments of the present disclosure. This figure is merely an example, which should not unduly limit the scope of the claims. One of ordinary skill in the art would recognize many variations, alternatives, and modifications. In some examples, the computer device 5000 includes processing unit 5002, a memory unit 5004, an input unit 5006, an output unit 5008, and a communication unit 5010. In various examples, the computer device 5000 is configured to be in communication with a user 5100 and/or a storage device 5200. In certain examples, the system computer device 5000 is configured according to system 100 of FIG. 1, system 200 of FIG. 2, and/or to implement method 300 of FIG. 3, method 400 of FIG. 4, and/or method 500 of FIG. 5. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, processing unit 5002 is configured for executing instructions, such as instructions to implement method 300 of FIG. 3, method 400 of FIG. 4, and/or method 500 of FIG. 5. In some embodiments, executable instructions may be stored in the memory unit 5004. In some examples, processing unit 5002 includes one or more processing units (e.g., in a multi-core configuration). In certain examples, processing unit 5002 includes and/or is communicatively coupled to one or more modules for implementing the systems and methods described in the present disclosure. In some examples, processing unit 5002 is configured to execute instructions within one or more operating systems, such as UNIX, LINUX, Microsoft Windows®, etc. In certain examples, upon initiation of a computer-implemented method, one or more instructions is executed during initialization. In some examples, one or more operations is executed to perform one or more processes described herein. In certain examples, an operation may be general or specific to a particular programming language (e.g., C, C #, C++, Java, or other suitable programming languages, etc.). In various examples, processing unit 5002 is configured to be operatively coupled to the storage device 5200, such as via an on-board storage unit 5012.

In various embodiments, the memory unit 5004 includes a device allowing information, such as executable instructions and/or other data to be stored and retrieved. In some examples, memory unit 5004 includes one or more computer readable media. In some embodiments, stored in memory unit 5004 include computer readable instructions for providing a user interface, such as to the user 5100, via the output unit 5008. In some examples, a user interface includes a web browser and/or a client application. In various examples, a web browser enables one or more users, such as the user 5100, to display and/or interact with media and/or other information embedded on a web page and/or a website. In certain examples, the memory unit 5004 include computer readable instructions for receiving and processing an input, such as from the user 5100, via the input unit 5006. In certain examples, the memory unit 5004 includes random access memory (RAM) such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAN).

In various embodiments, the input unit 5006 is configured to receive input, such as from the user 5100. In some examples, the input unit 5006 includes a keyboard, a pointing device, a mouse, a stylus, a touch sensitive panel (e.g., a touch pad or a touch screen), a gyroscope, an accelerometer, a position detector (e.g., a Global Positioning System), and/or an audio input device. In certain examples, the input unit 5006, such as a touch screen of the input unit, is configured to function as both the input unit and the output unit.

In various embodiments, the output unit 5008 includes a media output unit configured to present information to the user 5100. In some embodiments, the output unit 5008 includes any component capable of conveying information to the user 5100. In certain embodiments, the output unit 5008 includes an output adapter, such as a video adapter and/or an audio adapter. In various examples, the output unit 5008, such as an output adapter of the output unit, is operatively coupled to processing unit 5002 and/or operatively coupled to an presenting device configured to present the information to the user, such as via a visual display device (e.g., a liquid crystal display (LCD), a light emitting diode (LED) display, an organic light emitting diode (OLED) display, a cathode ray tube (CRT) display, an "electronic ink" display, a projected display, etc.) or an audio display device (e.g., a speaker arrangement or headphones).

In various embodiments, the communication unit 5010 is configured to be communicatively coupled to a remote device. In some examples, the communication unit 5010 includes a wired network adapter, a wireless network adapter, a wireless data transceiver for use with a mobile phone network (e.g., Global System for Mobile communications (GSM), 3G, 4G, 5G, NFC, or Bluetooth), and/or other mobile data networks (e.g., Worldwide Interoperability for Microwave Access (WIMAX)). In certain examples, other types of short-range or long-range networks may be used. In some examples, the communication unit 5010 is configured to provide email integration for communicating data between a server and one or more clients.

In various embodiments, the storage unit 5012 is configured to enable communication between the computer device 5000, such as processing unit 5002, and an external storage device 5200. In some examples, the storage unit 5012 is a storage interface. In certain examples, the storage interface is any component capable of providing processing unit 5002 with access to the storage device 5200. In various examples, the storage unit 5012 includes an Advanced Technology Attachment (ATA) adapter, a Serial ATA (SATA) adapter, a Small Computing system Interface (SCSI) adapter, a RAID controller, a SAN adapter, a network adapter, and/or any other component capable of providing processing unit 5002 with access to the storage device 5200.

In some examples, the storage device 5200 includes any computer-operated hardware suitable for storing and/or retrieving data. In certain examples, storage device 5200 is integrated in the computer device 5000. In some examples, the storage device 5200 includes a database, such as a local database or a cloud database. In certain examples, the storage device 5200 includes one or more hard disk drives. In various examples, the storage device is external and is configured to be accessed by a plurality of server systems. In certain examples, the storage device includes multiple storage units such as hard disks or solid state disks in a redundant array of inexpensive disks (RAID) configuration. In some examples, the storage device 5200 includes a storage area network (SAN) and/or a network attached storage (NAS) system.

One or More Computing Systems According to Various Embodiments

Figure 7:
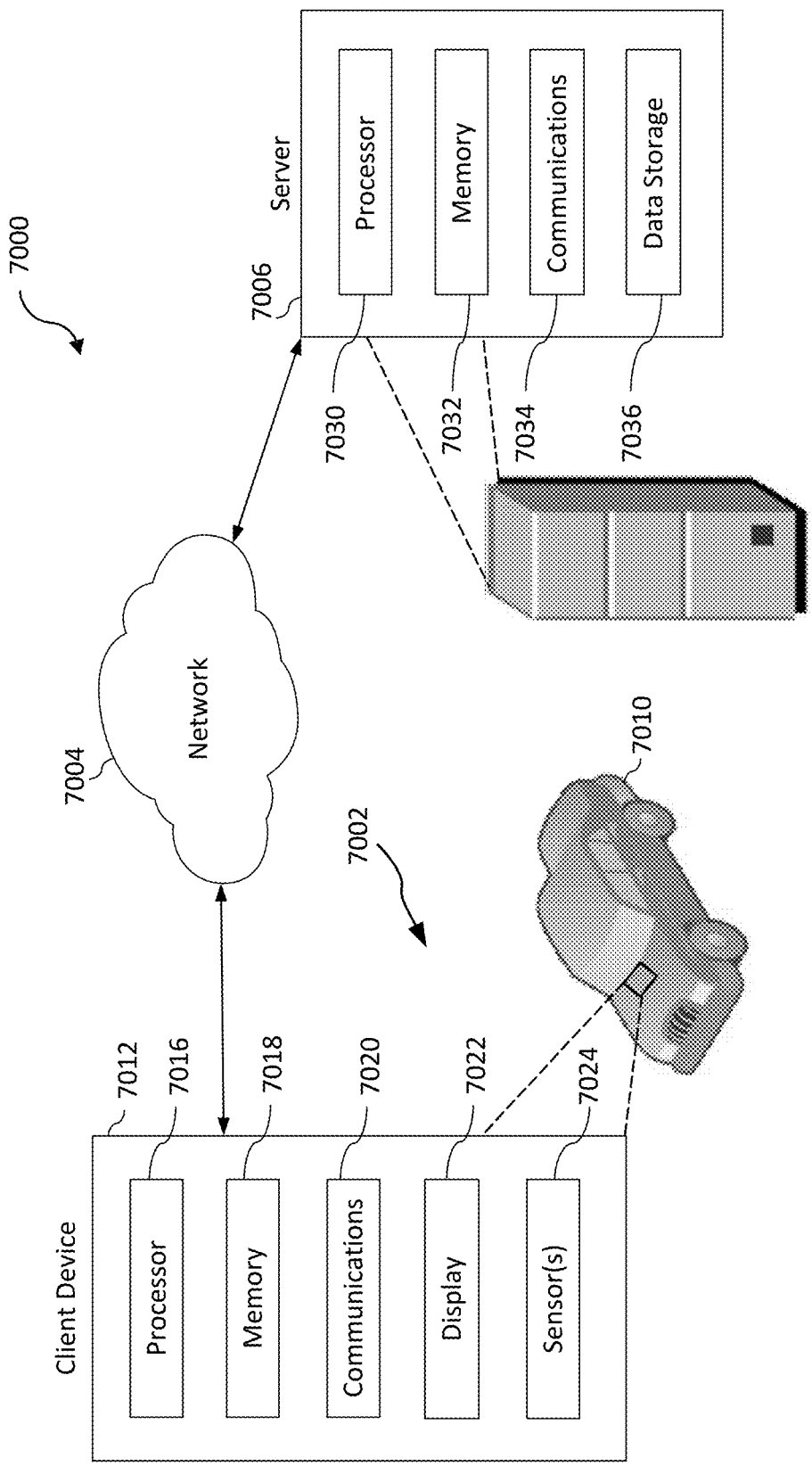
FIG. 7 is a simplified diagram showing a computer system, according to various embodiments of the present disclosure.

FIG. 7 is a simplified computing system 7000 according to various embodiments of the present disclosure. This figure is merely an example, which should not unduly limit the scope of the claims. One of ordinary skill in the art would recognize many variations, alternatives, and modifications. In some examples, the system 7000 includes a vehicle system 7002, a network 7004, and a server 7006. In certain examples, the system 7000, the vehicle system 7002, and/or the server 7006 is configured according to system 100 of FIG. 1, system 200 of FIG. 2, and/or to implement method 300 of FIG. 3, method 400 of FIG. 4, and/or method 500 of FIG. 5. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the vehicle system 7002 includes a vehicle 7010 and a client device 7012 associated with the vehicle 7010. In various examples, the client device 7012 is an on-board computer embedded or located in the vehicle 7010. As an example, the client device 7012 is a mobile device (e.g., a smartphone) that is connected (e.g., via a wired connection or a wireless connection) to the vehicle 7010. In some examples, the client device 7012 includes processor 7016 (e.g., a central processing unit (CPU), and/or a graphics processing unit (GPU)), a memory 7018 (e.g., storage unit, random-access memory (RAM), and/or read-only memory (ROM), flash memory), a communications unit 7020 (e.g., a network transceiver), a display unit 7022 (e.g., a touchscreen), and one or more sensors 7024 (e.g., an accelerometer, a gyroscope, a magnetometer, and/or a GPS sensor).

In various embodiments, the vehicle 7010 is operated by a user. In certain embodiments, the system 7000 includes multiple vehicles 7010, each vehicle of the multiple vehicles operated by a respective user of multiple users. In various examples, the one or more sensors 7024 monitors, during one or more vehicle trips, the vehicle 7010 by at least collecting data associated with one or more operating parameters of the vehicle, such as speed, speeding, braking, location, engine status, and/or other suitable parameters. In certain examples, the collected data include vehicle telematics data. According to some embodiments, the data are collected continuously, at predetermined time intervals, and/or based on one or more triggering events (e.g., when a sensor has acquired measurements greater than a threshold amount of sensor measurements). In various examples, the data collected by the one or more sensors 7024 correspond to user driving data, which may correspond to a driver's driving behaviors, in the methods and/or systems of the present disclosure.

According to various embodiments, the collected data are stored in the memory 7018 before being transmitted to the server 7006 using the communications unit 7020 via the network 7004 (e.g., via a local area network (LAN), a wide area network (WAN), or the Internet). In some examples, the collected data are transmitted directly to the server 7006 via the network 7004. In certain examples, the collected data are transmitted to the server 7006 via a third party. In some examples, a data monitoring system, managed or operated by a third party, is configured to store data collected by the one or more sensors 7024 and to transmit such data to the server 7006 via the network 7004 or a different network.

According to various embodiments, the server 7006 includes processor 7030 (e.g., a microprocessor, a microcontroller), a memory 7032 (e.g., a storage unit), a communications unit 7034 (e.g., a network transceiver), and a data storage 7036 (e.g., one or more databases). In some examples, the server 7006 is a single server, while in certain embodiments, the server 7006 includes a plurality of servers with distributed processing and/or storage. In certain examples, the data storage 7036 is part of the server 7006, such as coupled via a network (e.g., the network 7004). In some examples, data, such as processed data and/or results, may be transmitted from the data storage, such as via the communications unit 7034, the network 7004, and/or the communications unit 7020, to the client device 7012, such as for display by the display 7022.

In some examples, the server 7006 includes various software applications stored in the memory 7032 and executable by processor 7030. In some examples, these software applications include specific programs, routines, and/or scripts for performing functions associated with the methods of the present disclosure. In certain examples, the software applications include general-purpose software applications for data processing, network communication, database management, web server operation, and/or other functions typically performed by a server. In various examples, the server 7006 is configured to receive, such as via the network 7004 and via the communications unit 7034, the data collected by the one or more sensors 7024 from the client device 7012, and stores the data in the data storage 7036. In some examples, the server 7006 is further configured to process, processor 7030, the data to perform one or more processes of the methods of the present disclosure.

Examples of Certain Embodiments of the Present Disclosure

According to various embodiments, a computer-implemented method for transforming telematics data for agnostic use includes: receiving, from a first telematics system of a first type, telematics data in a first form, the telematics data being associated with a vehicle; and transforming, via a prediction model, the telematics data into a first prediction in a second form, the second form being: different from the first form, and the form which data collected, processed, stored, or transmitted by a second telematics system of a second type would be, the second type being different from the first type. In some examples, the method is implemented according to method 300 of FIG. 3, and/or configured to be implemented by system 100 of FIG. 1, device 5000 of FIG. 6, and/or system 7000 of FIG. 7.

According to various embodiments, the first form includes a first sampling rate, a first sampling time intervals, a first data unit, a first rotational calibration modifier, a first level of information; and the second form includes a second sampling rate, a second sampling time intervals, a second data unit, a second rotational calibration modifier, a second level of information; at least one of: the second sampling rate being different from the first sampling rate; the second sampling time intervals being different from first sampling time intervals; the second data unit being different from the first data unit; the second rotational calibration modifier being different from the first rotational calibration modifier; and the second level of information being different from the first level of information.

According to various embodiments, at least one of the first level of information and second level of information includes one or more driving behavioral inferences; the one or more driving behavioral inferences includes braking behaviors, steering behaviors, acceleration behaviors, distraction behaviors, or focus behaviors.

According to various embodiments, the first type includes a first model type, a first model year, a first firmware version, a first hardware version, a first data collection protocol, a first data processing protocol, a first data storing protocol, a first data transmission protocol; and the second type includes a second model type, a second model year, a second firmware version, a second hardware version, a second data collection protocol, a second data processing protocol, a second data storing protocol, a second data transmission protocol; at least one of: the second model type being different from the first model type; the second model year being different from the first model year; the second firmware version being different from the first firmware version; the second hardware version being different from the first hardware version; the second data collection protocol being different from the first data collection protocol; the second data processing protocol being different from the first data processing protocol; the second data storing protocol being different from the first data storing protocol; and the second data transmission protocol being different from the first data transmission protocol.

According to various embodiments, at least one of the first model type and the second model type is a vehicle on-board computer, a mobile device, or a wearable device.

According to various embodiments, the computer-implemented method for transforming telematics data for agnostic use further includes generating a discount for a user associated with the vehicle based at least in part upon the first prediction.

According to various embodiments, the computer-implemented method for transforming telematics data for agnostic use further includes receiving non-telematics data including one of survey data, customer data, game data, test data, site interaction data, and data associated with a quote flow. In some examples, generating the discount includes generating the discount based at least in part upon the first prediction and the non-telematics data.

According to various embodiments, the computer-implemented method for transforming telematics data for agnostic use further includes: receiving non-telematics data including one of survey data, customer data, game data, test data, site interaction data, and data associated with a quote flow; and transforming, via the prediction model, the non-telematics data into a second prediction in the second form. In some examples, generating the discount includes generating the discount based at least in part upon the first prediction and the second prediction.

According to various embodiments, the computer-implemented method for transforming telematics data for agnostic use further includes: collecting, via the second telematics system of the second type, telematics data in the second; and generating a discount for a user associated with the vehicle based at least in part upon the first prediction and the second telematics system of the second type.

According to various embodiments, the computer-implemented method for transforming telematics data for agnostic use further includes transmitting the first prediction to a target device configured to generate a discount for a user associated with the vehicle based at least in part upon data in the second form.

According to various embodiments, the computer-implemented method for transforming telematics data for agnostic use further includes: training the prediction model by at least: receiving, by a neural network, first training data of the first form associated with the first telematics system, the first training data being associated with a set of common trips; receiving, by the neural network, second training data of the second form associated with the second telematics system, the second training data being associated with the common set of trips; and modifying the neural network such that upon receiving the first training data as input, the neural network generates, based on the first training data, training output that substantially matches the second training data. In some examples, the first training data and the second training data differ in at least one of sampling rate, sampling time intervals, data unit, rotational calibration modifier, and level of information.

According to various embodiments, the telematics data include one of accelerometer data, gyroscope data, magnetometer data, location data, distraction data, speed limit data, speed data, braking events, cornering events, acceleration events, speeding events, time driving, and time distracted.

According to various embodiments, a computing system for one or more processors; and a memory storing instructions that, upon execution by the one or more processors, cause the computing system to perform one or more processes including: receiving, from a first telematics system of a first type, telematics data in a first form, the telematics data being associated with a vehicle; and transforming, via a prediction model, the telematics data into a first prediction in a second form, the second form being: different from the first form, and the form which data collected, processed, stored, or transmitted by a second telematics system of a second type would be, the second type being different from the first type. In some examples, the system is configured accordingly to system 100 of FIG. 1, device 5000 of FIG. 6, and/or system 7000 of FIG. 7 and/or configured to perform method 300 of FIG. 3.

According to various embodiments, a non-transitory computer-readable medium storing instructions for data management, the instructions upon execution by one or more processors of a computing system, cause the computing system to perform one or more processes including: receiving, from a first telematics system of a first type, telematics data in a first form, the telematics data being associated with a vehicle; and transforming, via a prediction model, the telematics data into a first prediction in a second form, the second form being: different from the first form, and the form which data collected, processed, stored, or transmitted by a second telematics system of a second type would be, the second type being different from the first type. In some examples, the non-transitory computer-readable medium, upon execution by one or more processors associated with system 100 of FIG. 1, device 5000 of FIG. 6, and/or system 7000 of FIG. 7 and/or causes the corresponding system to perform method 300 of FIG. 3.

Examples of Additional Embodiments of the Present Disclosure

According to various embodiments, a computer-implemented method for transforming telematics data for agnostic use includes: receiving, from a first telematics system of a first type, first telematics data in a first form, the first telematics data being associated with sensor data associated with a vehicle; and receiving, from a second telematics system of a second type, second telematics data in a second form, the second telematics data being associated with sensor data associated with the vehicle; transforming, via a prediction model, the first telematics data into a first prediction in a universal form; transforming, via the prediction model, the second telematics data into a second prediction in the universal form; and at least one of: transmitting the first prediction and the second prediction to a target device configured to generate a discount for a user associated with the vehicle based at least in part upon data in the universal form; and generating, via a discount model configured to generate discounts based at least in part upon data in the universal form, a discount for a user associated with the vehicle based at least in part upon the first prediction and the second prediction.

In some embodiments, the computer-implemented method further includes receiving non-telematics data including one of survey data, customer data, game data, test data, site interaction data, and data associated with a quote flow. In certain examples, generating the discount includes generating the discount based at least in part upon the first prediction, the second prediction, and the non-telematics data.

In some embodiments, the computer-implemented method further includes: receiving non-telematics data including one of survey data, customer data, game data, test data, site interaction data, and data associated with a quote flow; and transforming, via the prediction model, the non-telematics data into a third prediction in the universal form. In certain examples, generating the discount includes generating the discount based at least in part upon the first prediction, the second prediction, and the third prediction.

In some embodiments, the computer-implemented method further includes collecting vehicle sensor data during one or more trips using one or more sensors associated with a mobile device in association with the vehicle; and generating telematics data by at least processing the vehicle sensor data.

In some embodiments, the computer-implemented method further includes collecting third-party sensor data during one or more trips using one or more third-party sensors. In certain examples, generating the telematics data includes generating the telematics data by at least processing the vehicle sensor data and the third-party sensor data.

In some embodiments, at least one of the first telematics data and the second telematics data include one of accelerometer data, gyroscope data, magnetometer data, location data, distraction data, speed limit data, speed data, braking events, cornering events, acceleration events, speeding events, time driving, and time distracted.

According to various embodiments, a system for transforming telematics data for agnostic use includes: a data receiving module configured to: receive, from a first telematics system of a first type, first telematics data in a first form, the first telematics data being associated with sensor data associated with a vehicle; and receive, from a second telematics system of a second type, second telematics data in a second form, the second telematics data being associated with sensor data associated with the vehicle; and a data transforming module configured to: transform, via a prediction model, the first telematics data into a first prediction in a universal form; transform, via the prediction model, the second telematics data into a second prediction in the universal form; and at least one of: a prediction transmitting module configured to transmit the first prediction and the second prediction to a target device configured to generate a discount for a user associated with the vehicle based at least in part upon data in the universal form; and a discount generating module configured to generate, via a discount model configured to generate discounts based at least in part upon data in the universal form, a discount for a user associated with the vehicle based at least in part upon the first prediction and the second prediction.

According to various embodiments, a non-transitory computer-readable medium with instructions stored thereon, that upon execution by processor, causes processor to perform: receiving, from a first telematics system of a first type, first telematics data in a first form, the first telematics data being associated with sensor data associated with a vehicle; and receiving, from a second telematics system of a second type, second telematics data in a second form, the second telematics data being associated with sensor data associated with the vehicle; transforming, via a prediction model, the first telematics data into a first prediction in a universal form; transforming, via the prediction model, the second telematics data into a second prediction in the universal form; and at least one of: transmitting the first prediction and the second prediction to a target device configured to generate a discount for a user associated with the vehicle based at least in part upon data in the universal form; and generating, via a discount model configured to generate discounts based at least in part upon data in the universal form, a discount for a user associated with the vehicle based at least in part upon the first prediction and the second prediction.

One or More Examples of Machine Learning According to Various Embodiments

According to some embodiments, processor or processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, processing element may be provided with example inputs and their associated outputs and may seek to discover a general rule that maps inputs to outputs, so that when subsequent novel inputs are provided processing element may, based upon the discovered rule, accurately predict the correct output. In unsupervised machine learning, processing element may need to find its own structure in unlabeled example inputs.

One or More Examples of Modules According to Various Embodiments

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computing systems (e.g., a standalone, client or server computing system) or one or more hardware modules of a computing system (e.g., processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, processor or processors may be located in a single location (e.g., within a home environment, an office environment, or as a server farm), while in other embodiments processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Additional Considerations According to Various Embodiments

In some examples, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computing systems (e.g., a standalone, client or server computing system) or one or more hardware modules of a computing system (e.g., processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, processor or processors may be located in a single location (e.g., within a home environment, an office environment, or as a server farm), while in other embodiments processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for transforming telematics data for agnostic use, the method comprising:
   receiving, from a first telematics system of a first type, the telematics data in a first form, the telematics data being associated with a vehicle; and
   transforming, via a prediction model, the telematics data into a first prediction in a second form, the second form being:
   different from the first form, and
   a form for data collected, processed, stored, or transmitted by a second telematics system of a second type, the second type being different from the first type.

2. The computer-implemented method of claim 1, wherein:
   the first form includes a first sampling rate, a first sampling time intervals, a first data unit, a first rotational calibration modifier, a first level of information; and
   the second form includes a second sampling rate, a second sampling time intervals, a second data unit, a second rotational calibration modifier, a second level of information;
   at least one of:
   the second sampling rate being different from the first sampling rate;
   the second sampling time intervals being different from first sampling time intervals;
   the second data unit being different from the first data unit;
   the second rotational calibration modifier being different from the first rotational calibration modifier; and
   the second level of information being different from the first level of information.

3. The computer-implemented method of claim 2, wherein:
   at least one of the first level of information and the second level of information includes one or more driving behavioral inferences; and
   the one or more driving behavioral inferences includes braking behaviors, steering behaviors, acceleration behaviors, distraction behaviors, or focus behaviors.

4. The computer-implemented method of claim 1, wherein:
   the first type includes a first model type, a first model year, a first firmware version, a first hardware version, a first data collection protocol, a first data processing protocol, a first data storing protocol, a first data transmission protocol; and
   the second type includes a second model type, a second model year, a second firmware version, a second hardware version, a second data collection protocol, a second data processing protocol, a second data storing protocol, a second data transmission protocol;
   at least one of:
   the second model type being different from the first model type;

the second model year being different from the first model year;

the second firmware version being different from the first firmware version;

the second hardware version being different from the first hardware version;

the second data collection protocol being different from the first data collection protocol;

the second data processing protocol being different from the first data processing protocol;

the second data storing protocol being different from the first data storing protocol; and the second data transmission protocol being different from the first data transmission protocol.

5. The computer-implemented method of claim 4, wherein:

at least one of the first model type and the second model type is a vehicle on-board computer, a mobile device, or a wearable device.

6. The computer-implemented method of claim 1, further comprising:

generating a discount for a user associated with the vehicle based at least in part upon the first prediction.

7. The computer-implemented method of claim 6, further comprising:

receiving non-telematics data including one of survey data, customer data, game data, test data, site interaction data, and data associated with a quote flow; and wherein the generating the discount includes generating the discount based at least in part upon the first prediction and the non-telematics data.

8. The computer-implemented method of claim 6, further comprising:

receiving non-telematics data including one of survey data, customer data, game data, test data, site interaction data, and data associated with a quote flow; and transforming, via the prediction model, the non-telematics data into a second prediction in the second form;

wherein generating the discount includes generating the discount based at least in part upon the first prediction and the second prediction.

9. The computer-implemented method of claim 1, further comprising:

collecting, via the second telematics system of the second type, telematics data in the second form; and generating a discount for a user associated with the vehicle based at least in part upon the first prediction and the second telematics system of the second type.

10. The computer-implemented method of claim 1, further comprising:

transmitting the first prediction to a target device configured to generate a discount for a user associated with the vehicle based at least in part upon data in the second form.

11. The computer-implemented method of claim 1, further comprising:

training the prediction model by at least:

receiving, by a neural network, first training data of the first form associated with the first telematics system, the first training data being associated with a set of common trips;

receiving, by the neural network, second training data of the second form associated with the second telematics system, the second training data being associated with a common set of trips; and modifying the neural network such that upon receiving the first training data as input, the neural network generates, based on the first training data, training output that substantially matches the second training data;

wherein the first training data and the second training data differ in at least one of sampling rate, sampling time intervals, data unit, rotational calibration modifier, and level of information.

12. The computer-implemented method of claim 1, wherein the telematics data include one of accelerometer data, gyroscope data, magnetometer data, location data, distraction data, speed limit data, speed data, braking events, cornering events, acceleration events, speeding events, time driving, and time distracted.

13. A system for transforming telematics data for agnostic use, the system comprising:

one or more processors; and a memory storing instructions that, upon execution by the one or more processors, cause the system to perform one or more processes including:

receiving, from a first telematics system of a first type, telematics data in a first form, the telematics data being associated with a vehicle; and transforming, via a prediction model, the telematics data into a first prediction in a second form, the second form being:

different from the first form, and a form for data collected, processed, stored, or transmitted by a second telematics system of a second type, the second type being different from the first type.

14. The system of claim 13, wherein:

the first form includes a first sampling rate, a first sampling time intervals, a first data unit, a first rotational calibration modifier, a first level of information; and the second form includes a second sampling rate, a second sampling time intervals, a second data unit, a second rotational calibration modifier, a second level of information;

at least one of:

the second sampling rate being different from the first sampling rate;

the second sampling time intervals being different from first sampling time intervals;

the second data unit being different from the first data unit;

the second rotational calibration modifier being different from the first rotational calibration modifier; and the second level of information being different from the first level of information.

15. The system of claim 14, wherein:

at least one of the first level of information and the second level of information includes one or more driving behavioral inferences; and the one or more driving behavioral inferences includes braking behaviors, steering behaviors, acceleration behaviors, distraction behaviors, or focus behaviors.

16. The system of claim 13, wherein:

the first type includes a first model type, a first model year, a first firmware version, a first hardware version, a first data collection protocol, a first data processing protocol, a first data storing protocol, a first data transmission protocol; and the second type includes a second model type, a second model year, a second firmware version, a second hardware version, a second data collection protocol, a second data processing protocol, a second data storing protocol, a second data transmission protocol;

at least one of:
- the second model type being different from the first model type;
- the second model year being different from the first model year;
- the second firmware version being different from the first firmware version;
- the second hardware version being different from the first hardware version;
- the second data collection protocol being different from the first data collection protocol;
- the second data processing protocol being different from the first data processing protocol;
- the second data storing protocol being different from the first data storing protocol; and
- the second data transmission protocol being different from the first data transmission protocol.

17. A non-transitory computer-readable medium storing instructions for data management, the instructions upon execution by one or more processors of a computing system, cause the computing system to perform one or more processes including:
- receiving, from a first telematics system of a first type, telematics data in a first form, the telematics data being associated with a vehicle; and
- transforming, via a prediction model, the telematics data into a first prediction in a second form, the second form being:
  - different from the first form, and
  - a form for data collected, processed, stored, or transmitted by a second telematics system of a second type, the second type being different from the first type.

18. The non-transitory computer-readable medium of claim 17, wherein:
- the first form includes a first sampling rate, a first sampling time intervals, a first data unit, a first rotational calibration modifier, a first level of information; and
- the second form includes a second sampling rate, a second sampling time intervals, a second data unit, a second rotational calibration modifier, a second level of information;
- at least one of:
  - the second sampling rate being different from the first sampling rate;
  - the second sampling time intervals being different from first sampling time intervals;
  - the second data unit being different from the first data unit;
  - the second rotational calibration modifier being different from the first rotational calibration modifier; and
  - the second level of information being different from the first level of information.

19. The non-transitory computer-readable medium of claim 18, wherein:
- at least one of the first level of information and the second level of information includes one or more driving behavioral inferences; and
- the one or more driving behavioral inferences includes braking behaviors, steering behaviors, acceleration behaviors, distraction behaviors, or focus behaviors.

20. The non-transitory computer-readable medium of claim 17, wherein:
- the first type includes a first model type, a first model year, a first firmware version, a first hardware version, a first data collection protocol, a first data processing protocol, a first data storing protocol, a first data transmission protocol; and
- the second type includes a second model type, a second model year, a second firmware version, a second hardware version, a second data collection protocol, a second data processing protocol, a second data storing protocol, a second data transmission protocol;
- at least one of:
  - the second model type being different from the first model type;
  - the second model year being different from the first model year;
  - the second firmware version being different from the first firmware version;
  - the second hardware version being different from the first hardware version;
  - the second data collection protocol being different from the first data collection protocol;
  - the second data processing protocol being different from the first data processing protocol;
  - the second data storing protocol being different from the first data storing protocol; and
  - the second data transmission protocol being different from the first data transmission protocol.

\* \* \* \* \*